Patented Sept. 8, 1931

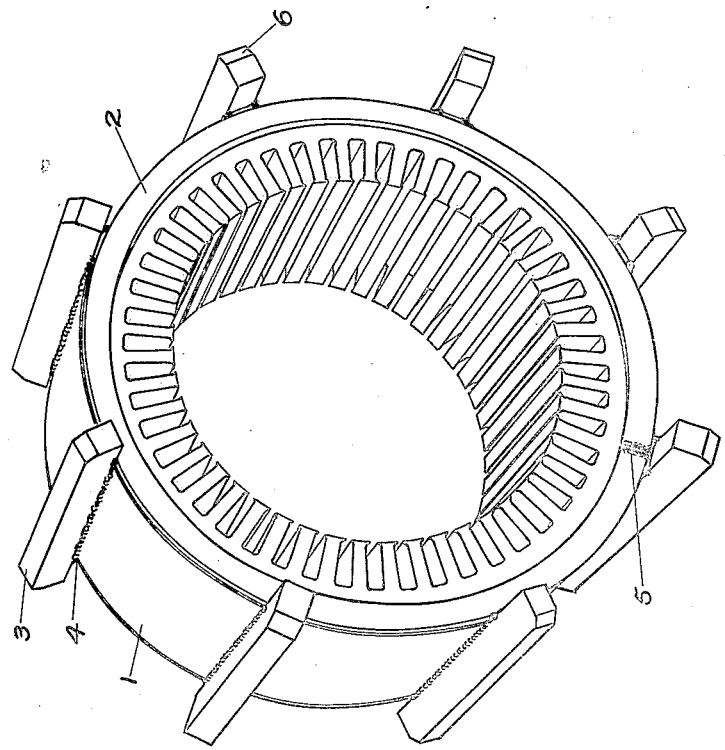

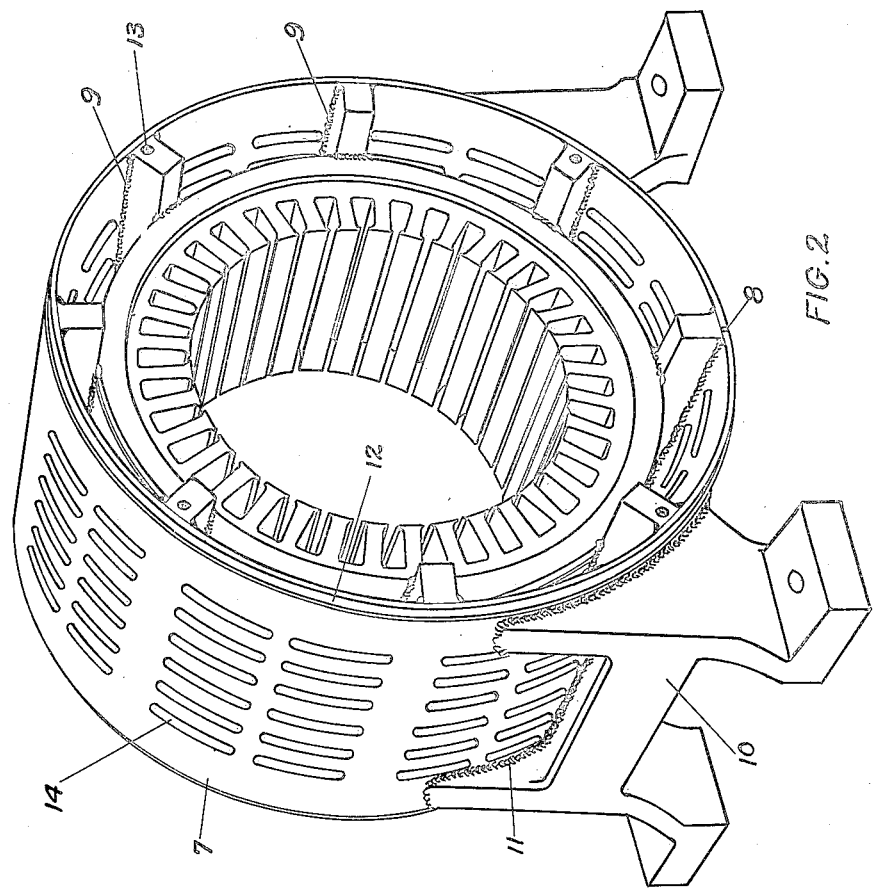

1,822,096

UNITED STATES PATENT OFFICE

EMIL E. HOLLANDER, OF EAST ORANGE, NEW JERSEY, ASSIGNOR TO STAR ELECTRIC MOTOR CO., OF NEWARK, NEW JERSEY

MOTOR FRAME CONSTRUCTION

Application filed July 24, 1929. Serial No. 380,504.

This invention relates to the construction of a dynamo electric machine, and particularly to the induction motor sub-division thereof.

The invention is directed primarily to the construction of the frame of the motor, including the assembly of the stator laminations.

The general object of my invention is to provide a motor which is much lighter than the usual constructon, but one which will be fully as efficient as the present-day construction, and one in which the cost taken from a number of angles, is materially reduced.

In the attainment of the general object as above set forth, many advantages are derived which will be more fully understood and appreciated after a reading of the following specification, taken in connection with the annexed drawings, and these advantages will therefore be outlined at the close of the specification. In the drawings, Figure 1 illustrates a perspective view of that part of the motor frame including the stator laminations and the means for holding them together and for positioning them in the shell or outer portion of the frame.

Figure 2 is a perspective view of the stator assembly shown in Figure 1, but included within the outer shell to which the support members are attached.

In the drawings, the laminations 1 comprising the stator stack, are assembled between two end rings 2, only one of which shows, on a suitable stacking fixture, preferably of the horn type, and after the stack is completed, pressure is applied through the fixture to draw the laminations 1 and the end rings 2 to the desired position; and then while so clamped, bars or ribs 3 are placed on the outer periphery of the stator and preferably welded along both sides, as indicated at 4, to the laminations 1, as well as to the rings 2. Since this welding operation is performed on the extreme outer edge of the laminations, their union at this point does not affect the efficiency of the motor, as the weld is substantially out of the path of the magnetic flux which passes through the core and teeth of the stator laminations, which for the purpose of clarity, are shown without any windings therein.

Preferably the end rings 2 are made from strip stock bent around and welded at 5. The ends of the ribs or bars 3 are preferably slightly beveled at 6 to assist in machining an annular dowel 12 on the shell 7, and in assembly of the end bearing housings.

After the stator has been assembled as shown in Figure 1, it is ready for the outside shell 7, which is made from sheet or rolled plate stock of standard dimensions, which can be cut or sheared to suit the width and diameter of the stator with which it is to be used. The plate 7 is then suitably formed to the diameter desired and then placed over the outer surface of the ribs or bars 3, where it is held by a suitable fixture and welded at the point 8. The shell is also welded to the different ribs 3 as indicated at 9, after which support legs 10, which may be punched or cast, are welded as indicated at 11, to the opposite sides of the shell 7. The stator is mounted in a suitable machine and an annular dowel 12 is preferably turned on the opposite ends of the shell 7 to form a dowel support for the end rotor bearing housings. Also, certain of the ends of the bars 3 are drilled and tapped at 13 to fasten the bearing housings to the ends of the motor.

The winding may be placed in the stator after it is completed, as shown in Figure 1, or after it has been assembled as shown in Figure 2. If desired, the shell 7 may be punched with a series of holes 14, of suitable dimensions, for ventilating purposes; but if the motor is desired to be fully enclosed, then the sheet stock or shell 7 is formed without the perforations 14.

By using the construction herein described, many advantages are obtained. Since the shell 7 is made of sheet steel, this can be obtained in large sheets which take a minimum amount of space during the transportation of raw material and in the factory stock room over and above the cast steel or grey iron castings which are now usually employed. The cost of the sheet steel used for the shell 7 and the bars 3, is from twenty-five to forty per cent. less than cast steel and grey iron, and the weight is only about one-half.

It will be apparent from what has been said that the machine work on this improved construction is materially reduced, and furthermore, the construction is such as to give great flexibility in changes in design, and adaptability to special designs. Another advantage is that due to the low cost of the sheet stock, much less capital is tied up in investment in raw material, and less machinery is required to manufacture machines of this design.

Furthermore, I have found that due to the welding operations of the laminations to the cross bars and to the shell or jacket, the noises due to loose laminations on motors of this character are reduced to a minimum.

A further advantage is that due to the thin steel jacket or shell, the heat is carried away faster from the motor, and therefore the motor can be called on to stand heavier loads. This construction eliminates all expense of large patterns used for making cast frames, and therefore permits enormous saving in the capital invested in these items. I have also found that these motors are more efficient, because the construction herein described really makes a more rigid machine and the air gap dimensions are more closely held. Other advantages besides those herein set forth, will occur to one skilled in this art, without enumerating more.

The support legs 10 will not be required where the motor is supported in a separate cradle mounting, or where it is mounted vertically. Also the complete stator structure may be used in a cast frame if one so desires for any purpose and the bars 3 can be made of any suitable dimensions to suit requirements.

In large motors, it may be advisable to make the cover 7 in more than one piece, but when the welding is done, it becomes in effect one piece which I refer to broadly as a cover, and the claims are intended to cover the invention in a generic manner, as well as specifically.

Having thus described my invention, what I claim is:

1. A motor frame construction comprising; a stack of stator laminations, bars positioned on the outer periphery of the stator completely outside the boundary thereof and fastened thereto, a metallic plate formed to circumferentially fit over said bars and fastened thereto, support means fastened to opposite sides of said plate, dowel seats provided in the edges of said plate, and means provided in the ends of certain of said bars for drawing rotor bearing housings into rigid engagement with said plate seats.

2. A motor frame construction comprising; a stack of stator laminations positioned between end rings, a plurality of metallic bars circumferentially spaced around the outer periphery of the stator and welded to the end rings and to the stator laminations, said bars projecting endwise beyond the stator ends, a metallic plate having a width substantially corresponding to the length of said bars and formed to circumferentially fit symmetrically over said bars and welded thereto, support means welded to said plate, said plate having an annular dowel formed therein after being welded to said bars, and means provided in the ends of certain of said bars for fastening rotor bearing housings against said annular dowel.

3. A motor frame construction including; a stator composed of a stack of laminations arranged to receive electrical conductors and held together by metallic bars welded to the outer periphery of the laminations and a cover for enclosing the stator, said cover being in one piece cut, perforated and formed from sheet steel to fit over said bars and then welded thereto and then having a dowel seat formed on both edges; support lugs welded to the cover, and means for fastening rotor bearing housings through said bar to the dowel seat on the cover structure.

4. A motor frame construction including; a stator assembly comprising a stack of laminations formed to receive windings, bars positioned on the outer periphery of said stack and welded along their length thereto, a sheet steel cover positioned over said bars and welded thereto, and means for attaching rotor bearing supports to opposite ends of the stator assembly.

5. The method of constructing a motor which consists, in stacking, a plurality of laminations of magnetic material arranged to receive electrical windings, on a fixture, clamping said laminations together in the fixture, placing bars properly cut from rod stock in spaced relation on the outer periphery of said stack and welding the bars thereto, cutting and forming from sheet metal a cover, placing and holding the cover over the outer surface of said bars and then welding the cover to said bars, machining a dowel seat in the opposite edges of the cover for rotor bearing housings, and drilling and tapping the ends of certain of said bars to provide means for holding said bearing housings in position.

In testimony whereof, I affix my signature.

EMIL E. HOLLANDER.